July 11, 1972   J. P. FRASER ET AL   3,676,091
METHOD FOR FORMING AND CIRCULATING PLUGS IN A PIPELINE
Filed Sept. 8, 1970   3 Sheets-Sheet 1
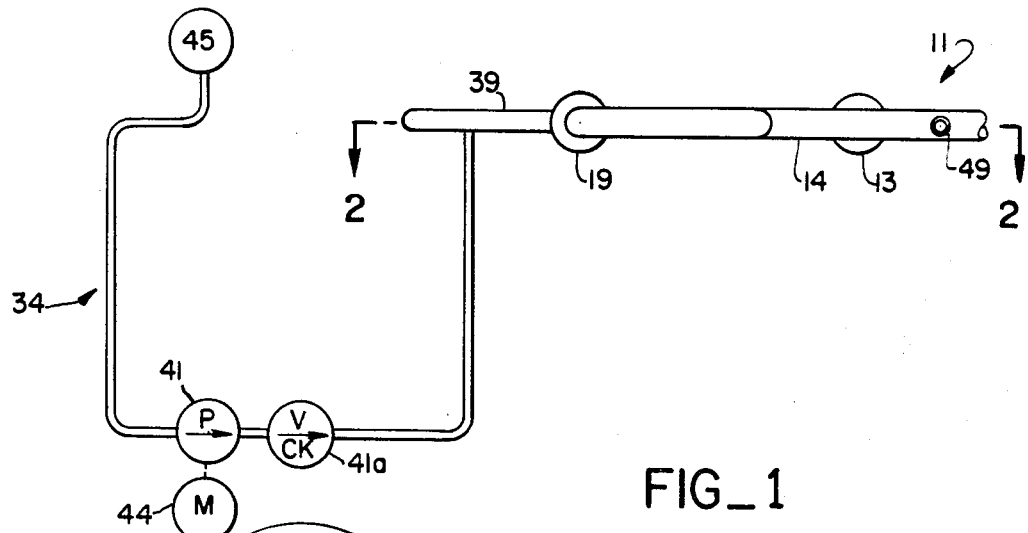
FIG_1
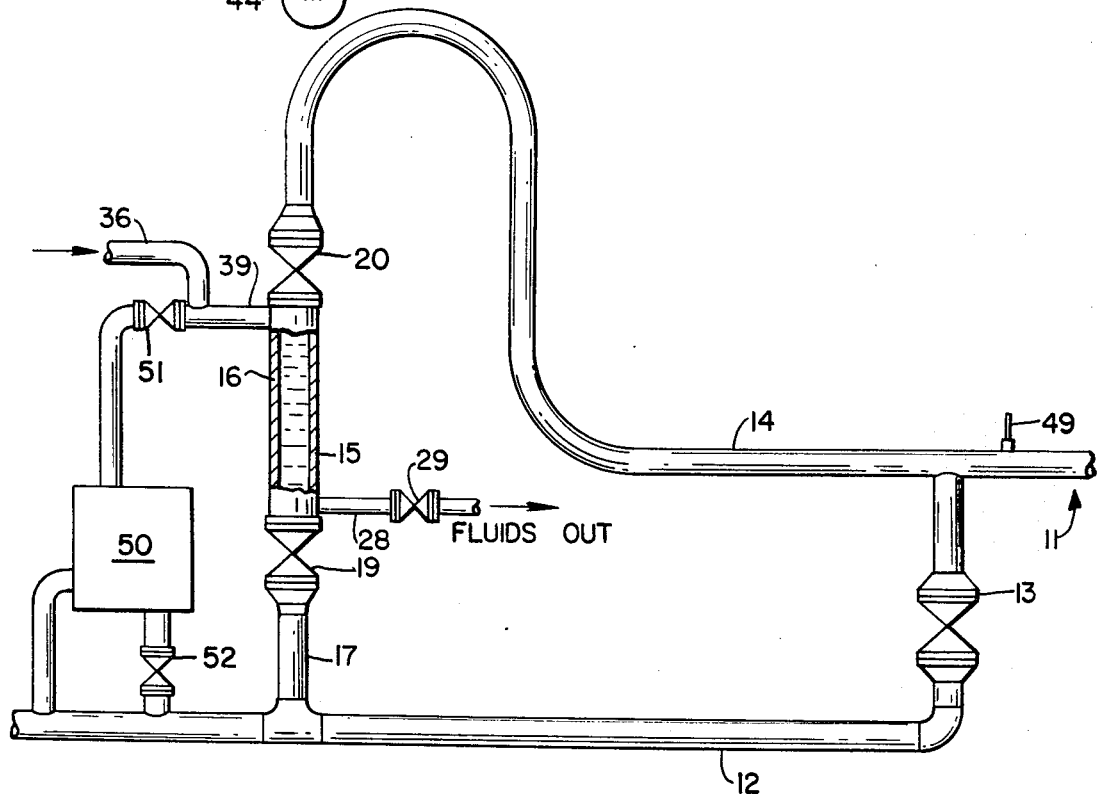
FIG_2
INVENTORS
JOHN P. FRASER
DAVID E. HARTMAN
BY Harold L. Hinkler
THEIR ATTORNEY

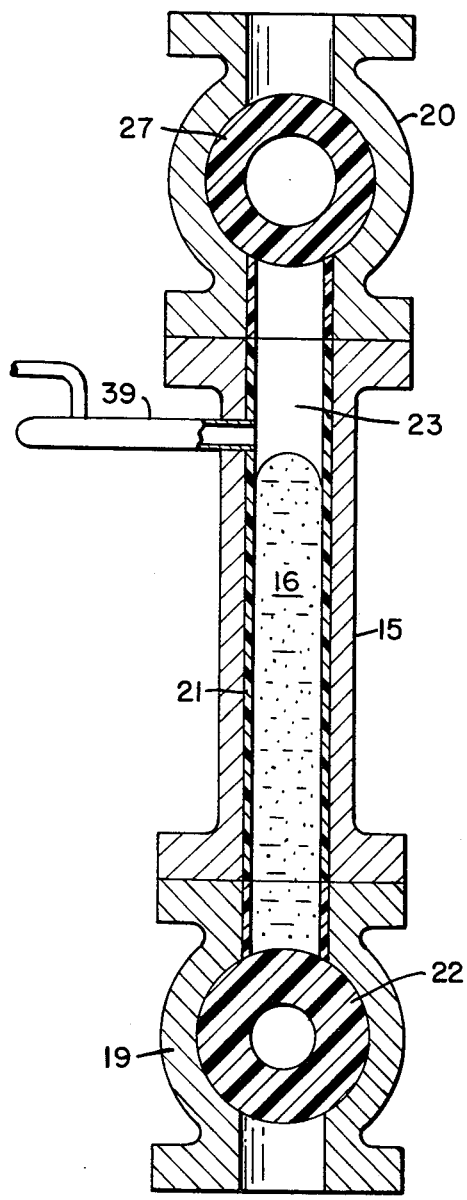
FIG_3
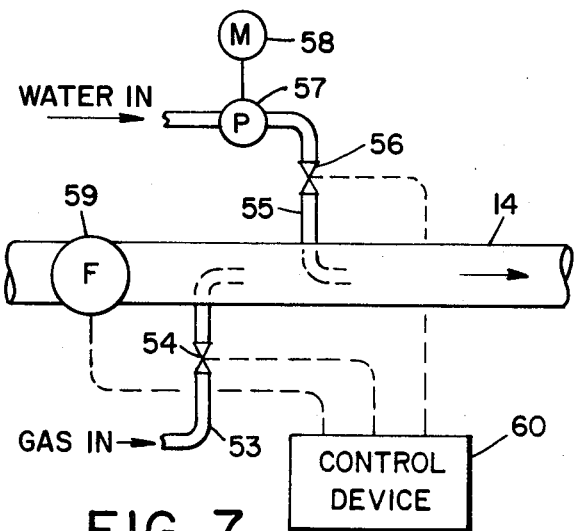
FIG_7
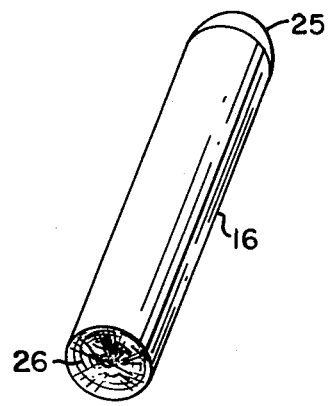
FIG_4

July 11, 1972   J. P. FRASER ET AL   3,676,091
METHOD FOR FORMING AND CIRCULATING PLUGS IN A PIPELINE
Filed Sept. 8, 1970   3 Sheets-Sheet 3
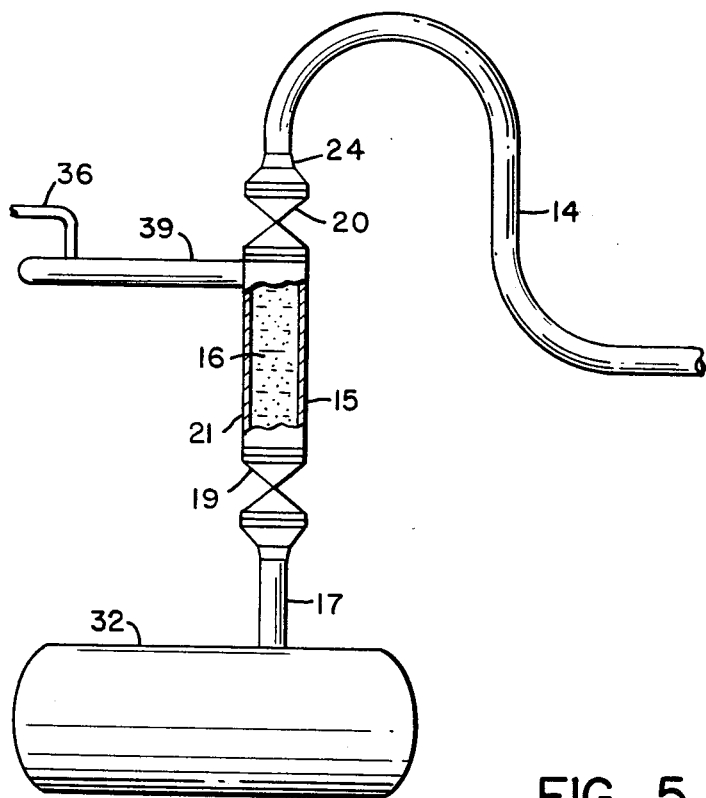
FIG_5
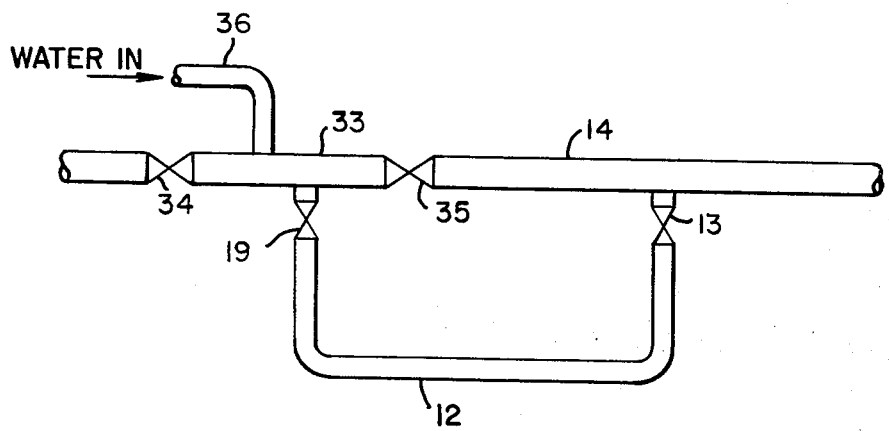
FIG_6
INVENTORS
JOHN P. FRASER
DAVID E. HARTMAN
BY
*Harold L. Dinkler*
THEIR ATTORNEY

United States Patent Office 3,676,091
Patented July 11, 1972

3,676,091
METHOD FOR FORMING AND CIRCULATING
PLUGS IN A PIPELINE
John P. Fraser, Houston, and David E. Hartman, Seabrook, Tex., assignors to Shell Oil Company, New York, N.Y.
Filed Sept. 8, 1970, Ser. No. 70,099
Int. Cl. F17d 1/04
U.S. Cl. 48—190                                  1 Claim

ABSTRACT OF THE DISCLOSURE

A method for forming and circulating a plug within a pipeline having a gas stream flowing therein by reacting water with gas to form a gas hydrate plug which is subsequently circulated through the pipeline.

BACKGROUND OF THE INVENTION

Field of the invention

This invention relates to an improved method for forming and circulating a plug within a pipeline; more particularly it relates to an improved method for forming in situ a gas hydrate plug within a pipeline having a gas stream flowing therein.

Description of the prior art

The method most commonly used for injecting plugs (i.e., scrapers, pipeline spheres, etc.) into a pipeline system consists of transporting the plug to the site by one or more methods of transportation, manually inserting the plug into an extension of the pipeline system and then manually diverting the stream to cause the plug to enter the pipeline system proper. The cost of transporting and handling these plugs is high. These plugs are used in interface control when different fluids are flowing one after another through the same pipeline. In the petroleum industry for example, crude oil of high sulfur content may follow or precede a crude oil of low sulfur content, or gasoline may follow fuel oil in a products line. Intermixing of such flows is undesirable since the more valuable composition may become adulterated by intermixing with even minor quantities of the less valuable composition.

Such plugs (or, more appropriately referred to as "pigs" in the pipeline art) serve an additional function in acting as a scraper for removing sediment and scale from the internal walls of the pipeline. The removal of scale from the walls of the pipeline is necessary in order to maintain the capacity of the line at a constant level. If scale is allowed to build up in the line, the capacity of the line is reduced.

Further, two phase (gas-liquid) pipelines are usually less efficient than single-phase pipelines owing to accumulation of liquids in the low spots in the pipelines. A commonly-used technique for improving the flow efficiency in such gas-carrying pipelines is to periodically remove the accumulated liquids by means of a rubber sphere. However, as discussed hereinabove, the costs of the spheres and their transportation to the point of injection into the pipeline are both high with significant mechanical problems in handling such large spheres.

Recently, it has been suggested to form in situ plugs from one of the liquids or mixtures flowing in a common pipeline system. These plugs are called "gelled plugs." Thus, one prior art procedure suggested for controlling the interfaces between the different fluids flowing in the same pipeline is to form in situ a fluid or liquid plug in the pipeline. This liquid plug is so formed by combining hydrocarbon and water gel to obtain a gel-like mass which then moves with the fluids in the pipeline under normal pumping pressure. This type of plug is described in Pat. No. 3,209,771 to Gogarty et al. However, one disadvantage of this type of plug is that surface irregularities within the pipeline may distort the shape of the gelled plug and break it into pieces. There will be then an undesirable mixing between the different fluids however minor the breakage of the gelled plug.

The prior art plus discussed above would not have the necessary rigidity to function as both a fluid interface controller and a pig scraper. In other words, gelled plugs would not eliminate the need for conventional plugs, scrapers, spheres, etc.

In a copending application to Scott, Ser. No. 647,819 filed June 21, 1967, and now U.S. Pat. 3,498,838 it is suggested to form a plug in situ with a pipeline by reacting materials therein adapted to form a plug of a cellular polyurethane material. However, such a technique requires materials to be reacted to form the plug, in addition to those materials already present in the pipeline or readily available.

SUMMARY OF THE INVENTION

It is an object of this invention to provide a pipeline plug which can be readily and easily formed within a pipeline and function as either a pig scraper or provide interface control, or both.

It is a further object of this invention to provide an improved method for forming and circulating a plug in situ within a pipeline having a gas stream flowing therein. These and other objects are preferably accomplished by reacting water with gas to form a gas hydrate plug which is subsequently circulated through the pipeline.

BRIEF DESCRIPTION OF THE DRAWING

FIG. 1 is a diagrammatic plan view of a preferred system for carrying out the concepts of the invention;

FIG. 2 is a vertical sectional view taken along lines 2—2 of FIG. 1;

FIG. 3 is a vertical sectional view of a portion of the system of FIG. 1;

FIG. 4 is an isometric view of a plug formed by the method of our invention;

FIGS. 5 and 6 are vertical sectional views similar to that of FIG. 2 showing modifications of the system of FIGS. 1 and 2; and FIG. 7 is a schematic illustration of still another embodiment of the invention.

DESCRIPTION OF THE PREFERRED EMBODIMENT

Hydrocarbons, especially gases such as methane, ethane, propane, etc., are known to form complex chemical compounds with water, all of which are loosely termed "gas hydrates." Such hydrocarbons include the lower alkyl hydrocarbons having from about one to four carbon atoms. In normal continuous operation a pipeline, gas hydrates are deliberately avoided, as, for example, by dehydration of the gas, raising its temperature, or use of an antifreeze additive, in order to avoid plugging the pipeline. In essence, the techniques of this invention involve the deliberate formation of a small amount of gas hydrate, sufficient to fill at least a length of pipeline equal to a small number of pipe diameters at discrete intervals in the pipeline. Such a small amount of hydrate acts as a semi-solid plug capable of being displaced through the pipeline by the gas pressure therein. Such plugs in turn sweep before them any liquids which may have accumulated in the pipeline. The gas hydrate plug may either be formed directly in the pipeline or may be formed in an external plug launching barrel and subsequently introduced into the pipeline.

Thus, referring to FIG. 1 of the drawing, a pipeline system 11 is illustrated having a gas inlet portion 12 (FIG. 2) controlled by a suitable valve 13, for removing a portion of the gas stream flowing in the pipeline 14 of pipeline system 11. A chamber or station 15 (FIG. 2) is arranged in communication with pipeline 14 for introducing a gas hydrate plug 16 into the pipeline 14. Gas from inlet portion 12, under pressure, enters station 15 through gas inlet 17 which is in communication with both station 15 and inlet portion 12 and is controlled by a suitable control valve 19. The opposite end of station 15 is preferably controlled by a ball valve 20. Station 15 may be either vertical or horizontal and is merely shown as vertical for illustration purposes. Station 15 is preferably of such a length that the length of plug 16 is at least equal to a small number of pipe diameters, as, for example, two or three times the diameter of pipeline 14.

The chamber 23 within station 15 may be slightly larger in cross-sectional area than the cross-sectional area of pipeline 14 so that the plug 16 is slightly compressed radially when it is introduced into pipeline 14. However, chamber 23 may be of the same inside diameter of pipeline 14, if desired. Plug 16 is illustrated in FIG. 4 as preferably having a cylindrical configuration with a rounded front end 25 and with a concave back end 26, this being the shape generally formed within station 15. A Teflon or the like lining 21 covers the internal wall of the area of station 15, occupied by plug 16 to reduce friction between plug 16 and the station 15 as will be described hereinbelow. Preferably, ball 22 of valve 19 and ball 27 of valve 20 are also formed by or covered by Teflon or similar material.

A control system 34 (FIG. 1) is in communication with station 15 occupied by plug 16. Control system 34 comprises a branch portion 36 and mixer 39. Branch portion 36 intersects with mixer 39, the mixer 39 cooperating with the chamber 23 of station 15 (FIG. 2) adapted to be occupied by plug 16. A pump 41 (FIG. 1) and a check valve 41a cooperate with branch portion 36 for controlling the introduction of water into chamber 23. Pump 41 is preferably controlled by a suitable motor 44. It may be desirable to provide means associated with chamber 23 for reducing the temperature therein, preferably to between 33° F. and 40° F. This may be done either by providing a cooling jacket on the outside (not shown) or by expanding the gas through a restriction entering into chamber 23. The expanded gas cools rapidly, and the water vapor in the gas is chilled, thus hydrates are formed.

Also, crystallizing agents may be provided on the wall of chamber 23 to give the hydrates a place to nucleate and grow. Such an agent may be potassium iodide, similar to the crystals used to "seed" clouds for causing rain.

A conventional settling chamber 50 (FIG. 2) may be associated with both mixer 39 and inlet portion 12 (FIG. 2) and controlled by suitable valves 51 and 52 as is well known in the art.

A storage chamber or vessel 45 (FIG. 1) operatively engages branch portion 36 for providing the introduction of water from a remote source (not shown) into branch portion 36 and into mixer 39, and thus into chamber 23. The water mixes with the gas from pipeline 14 present in mixer 39 and is conveyed into chamber 23 to form the gas hydrate plug 16 in station 15. If the fluid stream carried by pipeline 14 is a two-phase stream, means may be provided for separating the phases so that the fluid entering chamber 23 is a substantially gaseous phase, free of separate liquid hydrocarbon phase. However, the gas need not be "dry"; if it contains water vapor therein, it will be more likely to form the hydrate.

In operation, the gas hydrate plug 16 thus formed in chamber 23 may be launched through a predetermined schedule by opening valve 20 and valve 19 in that order. Valve 13 is then closed and gas is introduced under pressure through fluid inlet 17 and plug 16 is forced into pipeline 14. The plug thus formed in situ by the method disclosed previously can function as either a fluid interface controller, a pig scraper, or both.

Valve 13 opens after plug 16 is launched and has moved past inlet portion 12 having been detected by a conventional plug detector 49 in communication with pipeline 14. Valves 19 and 20 are closed, thus leaving chamber 23 filled with a gas under a desirable pressure. Chamber 23 is now ready to receive the water from line 36 to form a new plug. A suitable drain 28, controlled by valve 29, may be provided in communication with chamber 23 for draining fluids therefrom.

Thus, a gas hydrate plug is formed in situ and subsequently circulated through pipeline 14. Obviously, instead of removing gas from pipeline 14, a suitable gas, such as methane or ethane, from a remote source, such as gas storage vessel 32, may be injected directly into station 15 as illustrated in FIG. 5 wherein like numerals refer to like parts of FIG. 2. Also, although the invention has been described as injecting plug 16 from a separate chamber 15 directly into the pipeline 14, obviously chamber 15 may form an integral part of the pipeline 14 as illustrated in FIG. 6 wherein like numerals again refer to like parts of FIG. 2. Here, mixer 33 is integral with pipeline 14 and controlled by suitable valves 34 and 35. Water is introduced through inlet 36 into mixer 33 while gas from either a remote source (not shown) or pipeline 14 is passed, by means of control valves 13 and 19, into mixer 33. Portions of the system of FIG. 2 have been omitted for convenience of illusutration.

In all of the foregoing embodiments of our invention, any convenient ratio of gas-to-water may be used. For example, six to eight molecules of water to one molecule of gas, which is commonly known as the "hydrate number," may be used. The hydrate plugs may in some cases be formed directly in the pipeline 14 by injection of gas through a nozzle 53 (FIG. 7) (preferably a nozzle which atomizes the incoming water), controlled by valve 54, under pressure, at a rate governed by the flow rate of the gas flowing in the pipeline 14 and in sufficient proportion to form a short length (e.g., 2 to 3 pipe diameters long) of hydrate. In this case, no valves or by-pass is required.

Thus, as can be seen in FIG. 7, a like nozzle 55, controlled by valve 56, is provided for injecting water into pipe line 14. Nozzle 55 may be associated with a pump 57, actuated by a motor 58. Both nozzles open directly in pipeline 14 in the direction of fluid flow. A conventional flow rate sensor 59 may be associated with pipeline 14. The dotted lines indicate suitable connection to a control device 60 for opening valves 54, 56 and the flow rate sensor at suitable times and intervals for carrying out the foregoing. Deliberate formation of these plugs thus eliminates these requirements while maintaining the average water content of the gas at a level low enough that gas hydrates do not form inadvertently downstream.

The plugs may be formed in the manner set forth hereinabove or on an automatic basis, utilizing conventional sensor signals (not shown) for pressure, temperature, and overall water content of the gas present in the pipeline as input information for valving control.

We claim as our invention:

1. A method for forming and circulating a plug for use as a pig within a pipeline having a gas stream flowing therein, said pipeline including a chamber in selective communication therewith, said method comprising the steps of:

introducing into said chamber water and a gas which is adapted to form a chemical compound in the presence of water in an amount sufficient to form a gas hydrate plug therein having a length equal to at least twice the diameter of said pipeline;

maintaining said water and gas in said chamber for a period of time sufficient to allow said water and gas to react and form a unitary circulatable gas hydrate plug within said chamber;

discharging said gas hydrate plug by applying sufficient pressure to said plug to force it out of said chamber and into said pipeline; and circulating said gas hydrate plug as a pig within said pipeline.

References Cited

UNITED STATES PATENTS

| | | | |
|---|---|---|---|
| 2,356,407 | 8/1944 | Hutchinson | 48—190 |
| 3,495,380 | 2/1970 | Reman et al. | 48—190 X |
| 3,498,838 | 3/1970 | Scott | 134—8 |
| 3,514,274 | 5/1970 | Cahn et al. | 48—190 |

JOSEPH SCOVRONEK, Primary Examiner

R. E. SERWIN, Assistant Examiner

U.S. Cl. X.R.

134—8; 137—1, 15